United States Patent
Bernstein et al.

(10) Patent No.: US 10,452,661 B2
(45) Date of Patent: Oct. 22, 2019

(54) AUTOMATED DATABASE SCHEMA ANNOTATION

(71) Applicant: Microsoft Technology Licensing, LLC, Redmond, WA (US)

(72) Inventors: Philip A. Bernstein, Bellevue, WA (US); Yeye He, Redmond, WA (US); Eli Cortez Custodio Vilarinho, Redmond, WA (US); Lev Novik, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 328 days.

(21) Appl. No.: 14/743,510

(22) Filed: Jun. 18, 2015

(65) Prior Publication Data

US 2016/0371275 A1    Dec. 22, 2016

(51) Int. Cl.
| | | |
|---|---|---|
| G06F 16/00 | (2019.01) | |
| G06F 16/2457 | (2019.01) | |
| G06F 17/24 | (2006.01) | |
| G06F 16/20 | (2019.01) | |

(52) U.S. Cl.
CPC ........ *G06F 16/24578* (2019.01); *G06F 16/20* (2019.01); *G06F 16/24573* (2019.01); *G06F 17/241* (2013.01); *G06F 17/246* (2013.01)

(58) Field of Classification Search
CPC .......... G06F 17/3053; G06F 17/30286; G06F 17/30525; G06F 17/241; G06F 17/246; G06F 16/24578; G06F 16/24573; G06F 16/20

USPC ........................................ 707/741, 748, 749
See application file for complete search history.

(56) References Cited

U.S. PATENT DOCUMENTS

| | | | |
|---|---|---|---|
| 7,209,923 B1 | 4/2007 | Cooper | |
| 7,240,003 B2 | 7/2007 | Charlesworth et al. | |
| 7,640,254 B2 | 12/2009 | McConnell | |
| 8,055,674 B2 | 11/2011 | Ritchford et al. | |
| 8,321,424 B2 * | 11/2012 | Li .................... | G06F 17/30864 706/45 |
| 2003/0018632 A1 | 1/2003 | Bays et al. | |

(Continued)

OTHER PUBLICATIONS

Fan, et al., "A Hybrid Machine-Crowdsourcing System for Matching Web Tables", National University of Singapore, 2014, 12 pages.

(Continued)

*Primary Examiner* — Monica M Pyo
(74) *Attorney, Agent, or Firm* — Schwegman Lundberg & Woessner, P.A.

(57) ABSTRACT

Techniques and constructs that improve annotating target columns of a target database by performing automated annotation of the target columns using sources. The techniques include calculating a similarity score between a target column and columns extracted from a table that is included in a source. The similarity score is calculated based at least in part on a similarity between a value in the target column of the target database and a column value of the extracted column from the table and on a similarity between an identity of the target column of the target database and column identities of the extracted columns from the table. In some examples, the techniques calculate similarity scores for one or more extracted columns and annotate the target column based on the similarity scores.

20 Claims, 10 Drawing Sheets

(56) References Cited

U.S. PATENT DOCUMENTS

| | | | |
|---|---|---|---|
| 2004/0163050 A1* | 8/2004 | Matter | G06F 17/2205 715/255 |
| 2005/0198073 A1 | 9/2005 | Becks et al. | |
| 2006/0116983 A1* | 6/2006 | Dettinger | G06F 17/3053 |
| 2006/0277033 A1* | 12/2006 | Gao | G10L 15/063 704/10 |
| 2007/0192342 A1* | 8/2007 | Shriraghav | G06F 17/30442 |
| 2007/0271249 A1 | 11/2007 | Cragun et al. | |
| 2008/0208855 A1 | 8/2008 | Lingenfelder et al. | |
| 2009/0063455 A1* | 3/2009 | Li | G06F 17/30864 |
| 2010/0198823 A1 | 8/2010 | Tsoukalas et al. | |
| 2012/0101975 A1* | 4/2012 | Khosravy | G06Q 30/02 706/55 |
| 2012/0136650 A1* | 5/2012 | Udupa | G06F 17/273 704/9 |
| 2013/0238621 A1 | 9/2013 | Ganjam et al. | |
| 2015/0058337 A1 | 2/2015 | Gordon et al. | |
| 2015/0227589 A1* | 8/2015 | Chakrabarti | G06F 17/30525 707/748 |

OTHER PUBLICATIONS

PCT Search Report for PCT/US2016/035957, dated Jul. 28, 2016, 13 pages.

Ziqi Zhang, "Towards Efficient and Effective Semantic Table Interpretation", Department of Computer Science, Unoversity of Sheffield, UK, 2014, 13 pages.

PCT International Preliminary Report on Patentability dated Jan. 19, 2017 for PCT application PCT/US2016/035957, 7 pages.

Bhagavatula, et al., "Methods for Exploring and Mining Tables on Wikipedia", In Proceedings of the ACM SIGKDD Workshop on Interactive Data Exploration and Analytics, Aug. 11, 2013, pp. 19-27.

Cafarella, et al., "WebTables: Exploring the Power of Tables on the Web", In Proceedings of 34th International Conference on Very Large Data Bases, Aug. 23, 2008, 12 pages.

Deng, et al., "Scalable Column Concept Determination for Web Tables Using Large Knowledge Bases", In Proceedings of 39th International Conference on Very Large Data Bases, Aug. 26, 2013, 15 pages.

Lehmberg, et al., "Extending Tables with Data from over a Million Websites", In Proceedings of International Semantic Web Conference, Oct. 2014, 8 pages.

"Managing Linguistic Data", Published on: Oct. 24, 2012, Available at: http://www.nltk.org/book/ch11.html, 23 pages.

Sarma, et al., "Finding Related Tables", In Proceedings of the ACM SIGMOD International Conference on Management of Data, May 20, 2012, pp. 817-828.

Venetis, et al., "Recovering Semantics of Tables on the Web", In Proceedings of the VLDB Endowment, vol. 4, No. 9, Aug. 29, 2011, 11 pages.

PCT Written Opinion of the International Preliminary Examining Authority dated Oct. 18, 2016 for PCT application No. PCT/US2016/035957, 6 pages.

* cited by examiner

| Extracted Table 1006 | |
|---|---|
| U.S. States | Total Number of College Students |
| Washington | 250,000 |
| California | 320,000 |
| Florida | 220,000 |
| Texas | 275,000 |
| Arizona | 150,000 |
| New York | 289,000 |
| Nevada | 100,000 |

| Extracted Table 1004 | | |
|---|---|---|
| U.S. Cities | Working Population Per City | Unemployed Population |
| Spokane | 500,000 | 45,000 |
| Seattle | 1,200,000 | 80,000 |
| Olympia | 450,000 | 40,000 |
| Tacoma | 300,000 | 25,000 |
| Bellevue | 250,000 | 10,000 |
| San Diego | 750,000 | 50,000 |
| Austin | 600,000 | 42,000 |

| Target Table 1002 | |
|---|---|
| Washington Cities | W.P. |
| Spokane | 500,000 |
| Seattle | 1,200,000 |
| Olympia | 450,000 |
| Tacoma | 300,000 |
| Bellevue | 250,000 |

FIG. 10

AUTOMATED DATABASE SCHEMA ANNOTATION

BACKGROUND

Large enterprises typically have thousands of relational databases, each containing tens to hundreds of tables with one or more columns per table. In order to generate a new report or a new application using these tables, a user is faced with the problem of data discovery. Often, to find relevant information, the user must search through the relational databases and identify tables that include the relevant information. While searching through the tables for relevant information, the user must also understand the content of the tables and/or columns within the tables. As such, identifying relevant tables and/or columns of tables can be quite time consuming for the user and thus, a vast majority of the user's time is spent performing data discovery. One current approach used by enterprises for annotating target columns in a target database include employing data stewards and/or users of a target database to manually annotate each target column. Data stewards are employees dedicated to making the data of the enterprise usable. However, enterprises typically include thousands of target databases, each containing tens to hundreds of target tables with one or more target columns per table. As such, it can be economically inefficient and time consuming for an enterprise to employ data stewards to annotate target columns.

SUMMARY

The techniques and constructs discussed herein facilitate automated annotation of target columns of a target database using tables. A column annotation operation as described herein can take a name and/or other identity associated with a column from tabular data in a source and use it to annotate a target column of a target database. To identify the column to use for annotation from the tabular data in the source, the techniques include finding similarities between one or more values in the target column of the target database and one or more column values extracted from the column of the source and similarities between names associated with columns of the table containing the target column and column names associated with the columns in the source.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 10 depicts an example of annotating a target column of a target database.

DETAILED DESCRIPTION

Overview

Figure 1:
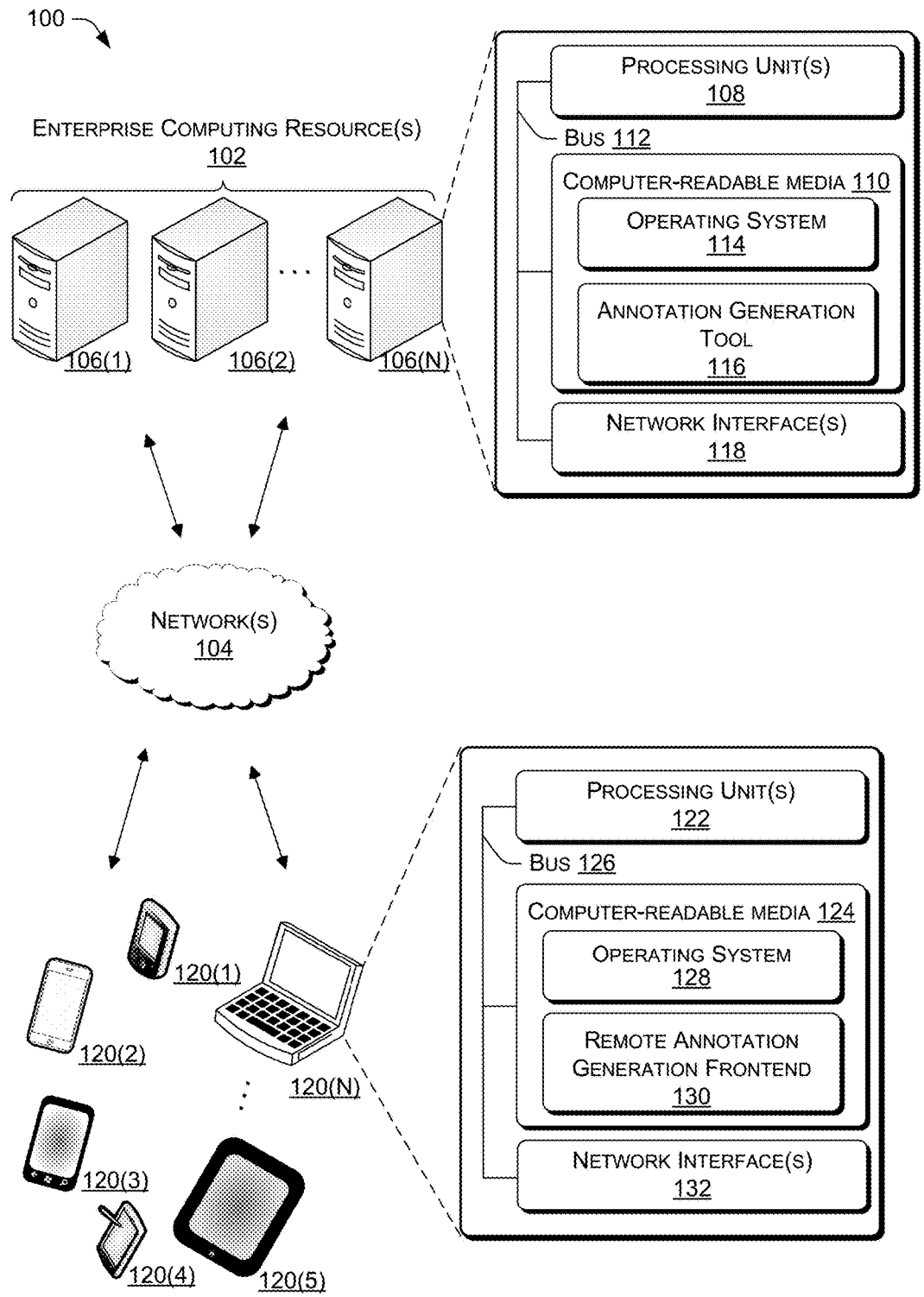
FIG. 1 is a block diagram depicting an example environment in which examples of automated annotation of target columns of a target database can operate.

Examples described herein provide techniques and constructs that improve annotating target columns of a target database by performing automated annotation of the target columns using tabular data from sources. As is described herein, sources can include spreadsheets, word documents, text documents, databases, HyperText Markup Language (HTML) tables, JavaScript Object Notation (JSON) document, eXtensible Markup Language (XML) documents, reports, and/or other sorts of documents or databases that include data in tabular form. Moreover, although the techniques are described herein using the term "column," as is well known, various operations can be used to manipulate rows to represent columns, and vice-versa. Thus, the techniques can equally be applied to rows including or after such manipulation.

The techniques annotate target columns in target databases by discovering sources, identifying potential tables within the sources for extraction, indexing the extracted tables, and using the indexes to annotate target columns in the target database. As such, the techniques described herein provide an improvement to other techniques that enterprises and/or users currently use to annotate target columns by automatically using tabular data from sources to annotate target columns.

In order to automate the annotation of a target column, the techniques described herein perform various operations. These operations include a discovery operation, which discovers the sources from which tabular data can be used to annotate target columns. Next, the operations include an extraction operation, which identifies and extracts tables from the sources. For instance, if a source includes a spreadsheet file, the extraction operation can identify and extract tables from the spreadsheet file. After extraction, the operations include an indexing operation, which indexes the extracted table. Next, the operations include an annotation operation, which annotates target columns using the indexes.

For instance, during a discovery operation, the techniques include crawling (e.g., with a data and/or web crawler) directories and databases to identify and retrieve sources. As discussed above, sources can include spreadsheets, word documents, text documents, databases, HTML tables, JSON documents, XML documents, reports, and/or other sorts of documents or databases that include data in tabular form. For example, in an enterprise environment, the discovery operation can include crawling the intranet pages of the enterprise to identify and retrieve sources, such as spreadsheets. When retrieving sources, the discovery operation can retrieve any number of sources. In some examples, the discovery operation retrieves a source corpus that represents the data that the enterprise stores in the target databases (e.g., relational databases).

During the extraction operation, the techniques include identifying and extracting tables from the sources. To identify tables for extraction, the extraction operation first identifies coordinates that represent a squared area within the source. The squared area within the source corresponds to the content area of the source. The content area of the source covers all of the textual content in the source and is identified by the coordinates of its four corners. For example, the content area of a spreadsheet file includes each of the cells within the spreadsheet file that includes data. Using the content area, the extraction operation then identifies tables for extraction within the content area.

To identify tables for extraction within the content area, the extraction operation uses one or more rules for identifying possible tables for extraction. For example, one rule that the extraction operation can use is that a content area includes a single table for extraction when the content area does not include any empty cells (i.e., cells without data). In such a situation, the extraction operation identifies the content area as a single table for possible extraction. An additional rule that the extraction operation can use is that if the content area includes at least one empty cell, the extraction operation can identify that two or more tables are present in the content area.

When two or more tables are present in a content area, the extraction operation can iterate over the cells in the content area to identify each of the tables for extraction. In some examples, iterating over the cells of the content area includes iterating from top to bottom and from left to right through the cells. In other examples, iterating over the cells of the content area may include using an alternative iteration method, such as from left to right and/or top to bottom. During the iteration process, the extraction operation can identify tables for extraction by identifying empty rows and empty columns included in the content area. For example, the extraction operation can identify that an empty row and an empty column together form a table boundary for a table. The extraction operation then can use these table boundaries to identify each of the tables for extraction within the content area.

After identifying tables for extraction within the content area of a source, the extraction operation then determines whether or not to remove any of the identified tables from the extraction process based on the data included in the tables. For instance, the extraction operation may omit a table from the extraction process based on the table including non-text fields in the first row. Tables with non-text fields in the first row may not have a header row (i.e., row that names the extracted table and/or names each column in the extracted table) and as such, may be identified as less helpful when naming target columns. However, if the first row of the extracted table includes only text fields, then the first row of the extracted table might be a header row for the extracted table with each column of the first row including a column name for the corresponding column of the extracted table. The first row might be even more likely to be a header row if each of its field values does not appear in other rows of the field's columns. As will be discussed below, an annotation operation can use column names for extracted columns of extracted tables to annotate target columns.

Besides omitting from extraction select tables that do not include header rows, the extraction operation can omit from extraction any tables based on a determination that the tables are not likely to help annotate target columns of a target database. In various examples, the extraction operation can omit from extraction, for example, tables that only include one column. In some examples, the extraction operation can omit from extraction one or more tables that are associated with columns in the source that include a threshold amount of empty cells. The threshold can be set to any of a number of values, such as 20%, 50%, 70%, 80%, or another real value. The extraction operation then can extract one or more of any remaining tables from the source for further processing.

The techniques described herein can further include an indexing operation that indexes extracted tables by both mapping column values to column names and column names to column values for extracted columns of the extracted tables. Column values for an extracted column include the data of the extracted column. For example, column values for an extracted column can include the data within each of the data cells that form the extracted column. The column name for an extracted column includes the name of the extracted column within the extracted table. For example, the column name can include a text field and/or data within the first row of the extracted column. As discussed above, the first row of an extracted column may be a header row. As such, the first row of the extracted column includes the column name of the extracted column.

The techniques described herein can further include an annotation operation that annotates target columns of a target database using the generated indexes. For instance, and as discussed above, extracted tables can be indexed using column names and column values for the extracted columns. As such, when annotating a target column using the indexes, the annotation operation can annotate the target columns using one or more column names from one or more extracted columns that are similar to the target column. The annotation operation determines the one or more extracted columns that are similar to the target column by calculating a similarity score for each of the one or more extracted columns using the indexes. The more similar an extracted column is to a target column, the more likely it is that the column name of the extracted column correctly identifies the target column.

For each extracted column to calculate a similarity score between an extracted column and a target column, the annotation operation can calculate a value-related score and a context-related score. The value-related score measures similarities between column values in the extracted column and column values in the target column. The larger the overlap between the column values in the extracted column and column values in the target column, the higher the value-related score will be. The context-related score measures similarities between column names in the extracted table from which the extracted column is included and column names in a target table from which the target column is included. The more similar the column names in the extracted table are to the column names in the target table, the higher the context-related score will be.

After calculating the value-related score and the context-related score for an extracted column, the annotation operation calculates the similarity score between the extracted column and the target column based on the value-related score and the context-related score. The annotation operation can use the similarity score calculated for multiple extracted columns to rank annotations for the target column.

The annotation operation can then annotate the target column by selecting column names associated with the extracted columns using the ranking. For instance, the annotation operation can annotate the target column using one or more column names from the extracted columns.

In some examples, data stewards and/or other users can manually evaluate the annotations of the target column to ensure that the annotations properly describe the target column. For instance, the annotation operation can annotate multiple target columns using the operations discussed above. In response, data stewards and/or other users can evaluate one or more of the annotated target columns to ensure that the annotations correctly describe the one or more target columns. When evaluating annotations of a target column, the data stewards and/or other users can discard annotations that do not properly annotate the target column.

It should be noted that the techniques described above can use extracted rows instead of extracted columns. For instance, the orientation of extracted tables can be flipped so that headers from columns are now oriented in rows. After flipping the orientation of the extracted tables, the techniques can perform each of the steps described above to annotate a target column of a target database.

Various examples, scenarios, and aspects are described further with reference to FIGS. 1-10.

Illustrative Environment

FIG. 1 shows an example environment 100 in which examples of automated annotation of target columns of a target database can operate. In some examples, the various devices and/or components of environment 100 include distributed computing resources 102 that can communicate with one another and with external devices via one or more networks 104.

For example, network(s) 104 can include public networks such as the Internet, private networks such as an institutional and/or personal intranet, or some combination of private and public networks. Network(s) 104 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 104 can utilize communications protocols, including packet-based and/or datagram-based protocols such as internet protocol (IP), transmission control protocol (TCP), user datagram protocol (UDP), or other types of protocols. Moreover, network(s) 104 can also include a number of devices that facilitate network communications and/or form a hardware basis for the networks, such as switches, routers, gateways, access points, firewalls, base stations, repeaters, backbone devices, and the like.

In some examples, network(s) 104 can further include devices that enable connection to a wireless network, such as a wireless access point (WAP). For instance, support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In various examples, distributed computing resources 102 include devices 106(1)-106(N). Examples support scenarios where device(s) 106 can include one or more computing devices that operate in a cluster or other grouped configuration to share resources, balance load, increase performance, provide fail-over support or redundancy, or for other purposes. Device(s) 106 can belong to a variety of categories or classes of devices such as traditional server-type devices, desktop computer-type devices, mobile devices, special purpose-type devices, embedded-type devices, and/or wearable-type devices. Thus, although illustrated as desktop computers, device(s) 106 can include a diverse variety of device types and are not limited to a particular type of device. Device(s) 106 can represent, but are not limited to, desktop computers, server computers, web-server computers, personal computers, mobile computers, laptop computers, tablet computers, thin clients, terminals, personal data assistants (PDAs), work stations, integrated components for inclusion in a computing device, or any other sort of computing device.

Device(s) 106 can include any type of computing device having one or more processing unit(s) 108 operably connected to computer-readable media 110 such as via a bus 112, which in some instances can include one or more of a system bus, a data bus, an address bus, a PCI bus, a Mini-PCI bus, and any variety of local, peripheral, and/or independent buses. Executable instructions stored on computer-readable media 110 can include, for example, an operating system 114, an annotation generation tool 116, and other modules, programs, or applications that are loadable and executable by processing units(s) 108. Alternatively, or in addition, the functionality described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from ZYLEX or ALTERA that includes a CPU course embedded in an FPGA fabric.

Device(s) 106 can also include one or more network interfaces 118 to enable communications between computing device(s) 106 and other networked devices, such as client computing device(s) 120 involved in the automated annotation of target columns in a target database, or other devices over network(s) 104. Such network interface(s) 118 can include one or more network interface controllers (NICs) or other types of transceiver devices to send and receive communications over a network. For simplicity, other components are omitted from the illustrated device(s) 106.

Other devices involved in automated annotation of target columns in a target database can include client computing devices 120(1)-120(N). Device(s) 120 can belong to a variety of categories or classes of devices such as traditional client-type devices, desktop computer-type devices, mobile devices, special purpose-type devices, embedded-type devices, and/or wearable-type devices. Thus, although illustrated as mobile computing devices, which may have less computing resources than device(s) 106, client computing device(s) 120 can include a diverse variety of device types and are not limited to any particular type of device. Client computing device(s) 120 can include, but are not limited to, computer navigation type client computing devices 120(1) such as satellite-based navigation systems including global positioning system (GPS) devices and other satellite-based navigation system devices, telecommunication devices such as mobile phone 120(2) mobile phone tablet hybrid 120(3), personal data assistants (PDAs) 120(4), tablet computers 120(5), laptop computers such as 120(N), other mobile computers, wearable computers, desktop computers, personal computers, network-enabled televisions, thin clients, terminals, work stations, integrated components for inclusion in a computing device, or any other sort of computing device.

Client computing device(s) 120 can represent any type of computing device having one or more processing unit(s) 122 operably connected to computer-readable media 124 such as via a bus 126, which in some instances can include one or more of a system bus, a data bus, an address bus, a PCI bus, a Mini-PCI bus, and any variety of local, peripheral, and/or independent buses.

Executable instructions stored on computer-readable media 124 can include, for example, an operating system 128, a remote annotation generation frontend 130, and other modules, programs, or applications that are loadable and executable by processing units(s) 122. Alternatively, or in addition, the functionally described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from ZYLEX or ALTERA that includes a CPU course embedded in an FPGA fabric.

Client computing device(s) 120 can also include one or more network interfaces 132 to enable communications between client computing device(s) 120 and other networked devices such as other client computing device(s) 120 or device(s) 106 over network(s) 104. Such network interface(s) 132 can include one or more network interface controllers (NICs) or other types of transceiver devices to send and receive communications over a network.

Figure 2:
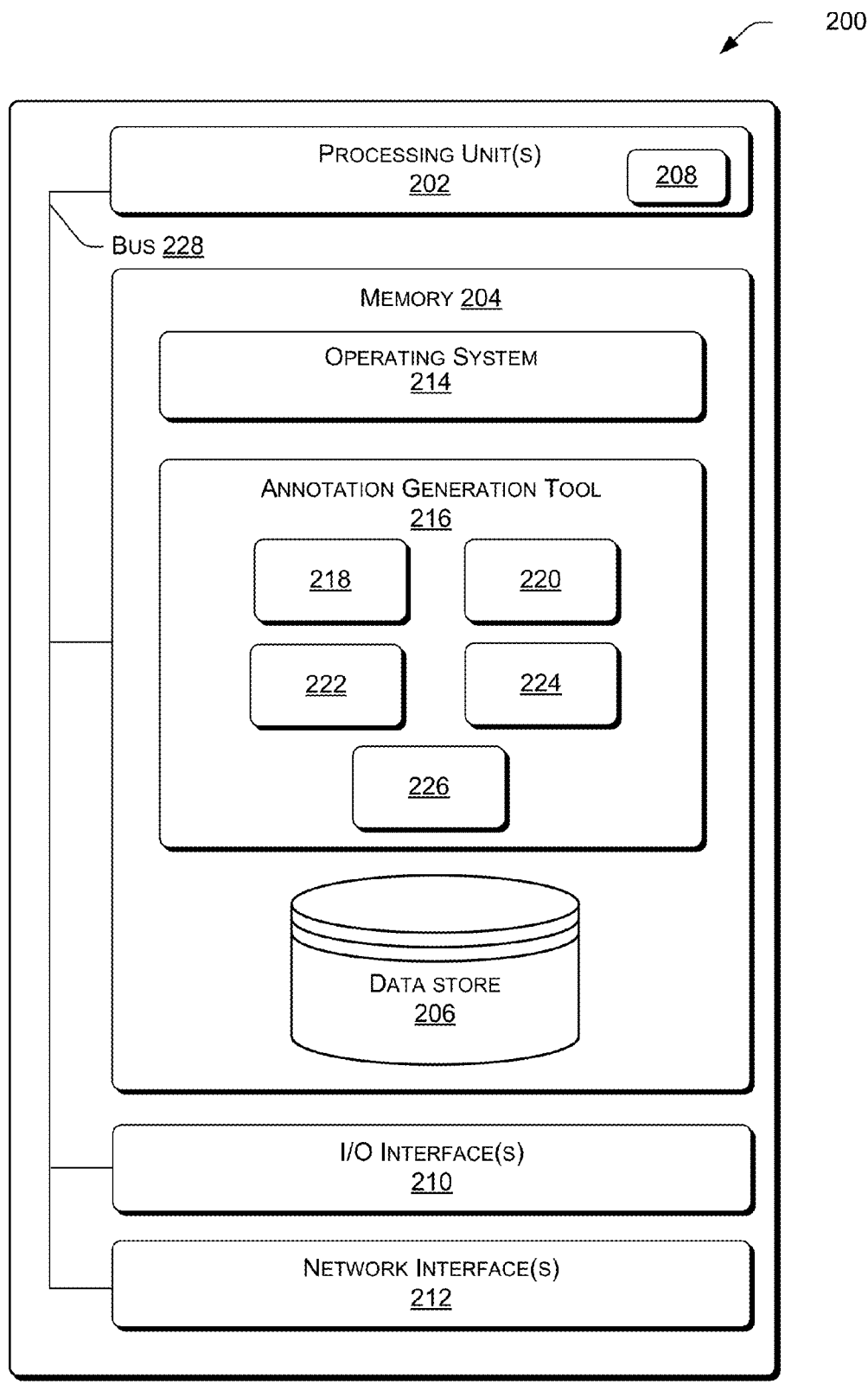
FIG. 2 is a block diagram depicting an example computing device of a distributed computing resource.

FIG. 2 is a block diagram depicting an example computing device 200 of a distributed computing resource, such as a device 106 from FIG. 1. In device(s) 200, processing unit(s) 202, can include processing unit(s) 108 and can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

In some examples, memory 204 can represent computer-readable media 110 and can store instructions executable by the processing unit(s) 202, which as discussed above, can represent a processing unit incorporated in device 200. Memory 204 can also store instructions executable by external processing units such as by an external CPU, an external GPU, and/or executable by an external accelerator, such as an FPGA type accelerator, a DSP type accelerator, or any other internal or external accelerator. In various examples at least one CPU, GPU, and/or accelerator can be incorporated in device 200, while in some examples one or more of a CPU, GPU, and/or accelerator can be external to device 200.

In the illustrated example, memory 204 also includes a data store 206. In some examples, data store 206 includes data storage such as a database, data warehouse, a relational database, or other type of structured or unstructured data storage. In some examples, data store 206 includes a corpus and/or a relational database with one or more sources, tables, indices, stored procedures, and so forth to enable automated annotation of target columns. The sources can include spreadsheets, word documents, text documents, databases, HTML tables, JSON documents, XML documents, reports, and/or other sorts of documents or databases that include data in tabular form. The tables can include extracted tables and/or target tables, which include target columns, as discussed herein. Data store 202 can store data for the operations of processes, applications, components, and/or modules stored in memory 204 and/or executed by processing unit(s) 202. Alternately, some or all of the above-referenced data can be stored on separate memories 208 on board one or more processing unit(s) 202 such as a memory on board a CPU-type processor, a GPU-type processor, an FPGA-type accelerator, a DSP-type accelerator, and/or another accelerator.

Device(s) 200 can further include one or more input/output (I/O) interfaces 210 to allow device 200 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). In addition, in device(s) 200, network interface(s) 212, which can include network interface(s) 118, can represent, for example, network interface controllers (NICs) or other types of transceiver devices to send and receive communications over a network.

In the illustrated example, memory 204 also includes an operating system 214, which can include operating system 114. Memory 204 also includes an annotation generation tool 216, which can include annotation generation tool 116. Annotation generation tool 216 can include one or more modules and/or APIs, which are illustrated as blocks 218, 220, 222, and 224, although this is just an example, and the number can vary higher or lower.

Functionality described associated with blocks 218, 220, 222, 224, and 226 can be combined to be performed by a fewer number of modules and/or APIs or it can be split and performed by a larger number of modules and/or APIs. For example, block 218 can represent a discovery module with logic to program processing unit 202 of device 200 for performing the discovery operations described herein. For example, discovery module 218 can discover sources by crawling through directories and databases, such as data store 206 and/or an external data store, to identify and retrieve sources. Sources can include spreadsheets, word documents, text documents, databases, HTML tables, JSON documents, XML documents, reports, and/or other sorts of documents or databases that include data in tabular form.

Block 220 can represent an extraction module with logic to program processing unit 202 of device 200 for performing the extraction operations described herein. For example, extraction module 220 can identify a content area within a source, determine whether the content area includes one or more tables for extraction, determine whether the one or more identified tables can annotate target columns in a target database, and extract the tables that can annotate target columns.

Block 222 can represent a value indexing module with logic to program processing unit 202 of device 200 for performing the indexing operation described herein. For example, value indexing module 222 can index extracted tables by mapping column values to column names and column names to column values for extracted columns included in the extracted tables.

Block 224 can represent a column annotation module with logic to program processing unit 202 of device 200 for performing the automated annotation operations described herein. For example, column annotation module 224 can use the indexes generated by the value indexing module to annotate one or more target columns in a target database. Column annotation module 224 can annotate a target column by calculating similarity scores for extracted columns, ranking the extracted columns based on the similarity scores, and annotates the target column using column names of the extracted columns based on the ranking.

Block 226 can represent an initialization module with logic to program processing unit 202 of device 200 to cause the automated annotation of target columns in a target database. For example, initialization module 226 can include an interface for receiving various types of input. The input can include commands that cause device 200 to start the automated annotation of target columns and/or cause device 200 to send commands to one or more additional computing devices (e.g., other computing device(s) 106) that cause the one or more additional computing devices to start the automated annotation of target columns. The input can also include search queries for data that is included in target columns of target database. For example, the input can include a search query for data that is stored in one or more relational databases of an enterprise.

Bus 228, which can include bus 112, and which in some instances can include one or more of a system bus, a data bus, an address bus, a PCI bus, a Mini-PCI bus, and any variety of local, peripheral, and/or independent buses, can operably connect memory 204 to processing unit(s) 202.

Figure 3:
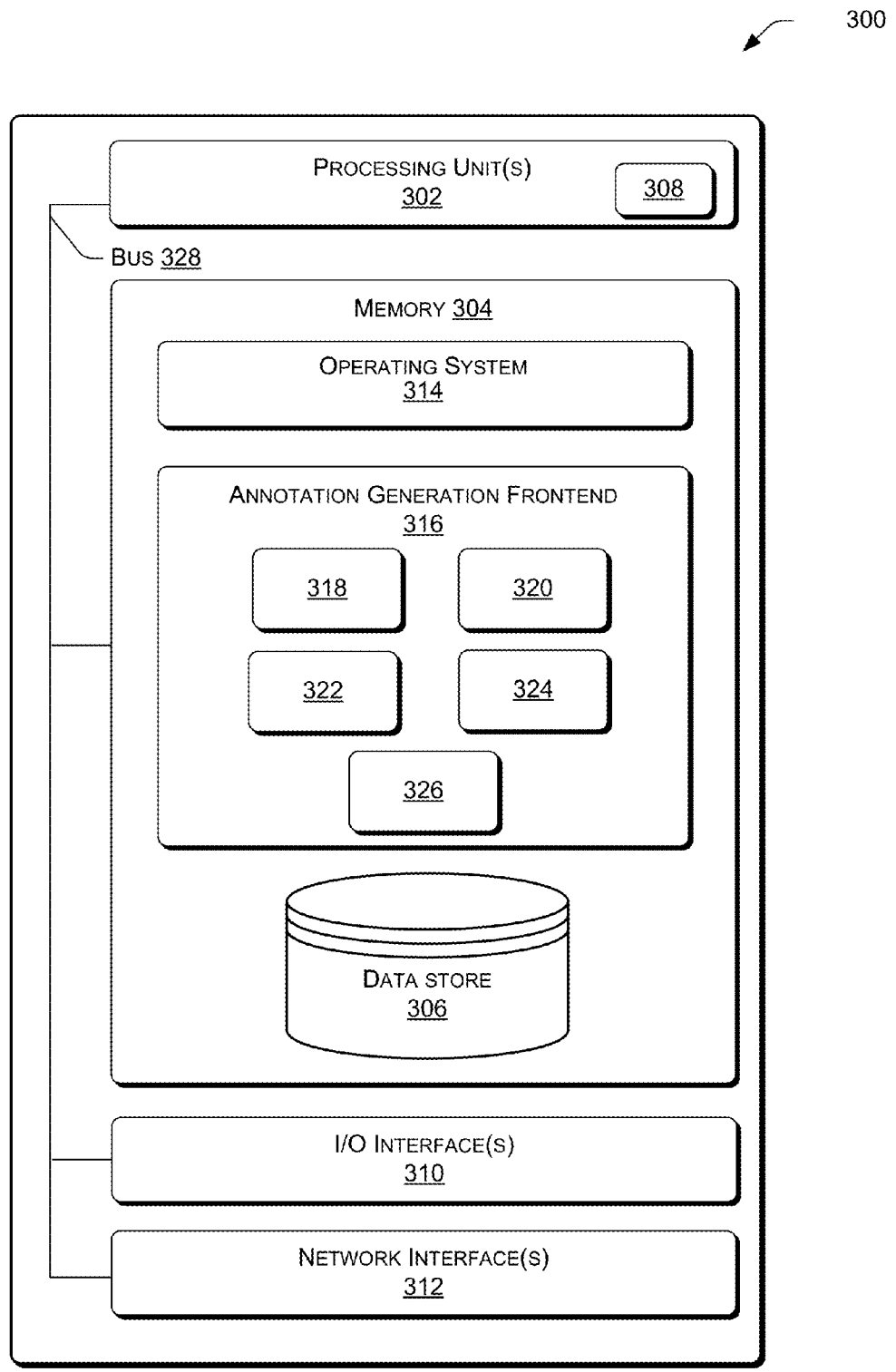
FIG. 3 is a block diagram depicting an example client computing device.

FIG. 3 is a block diagram depicting an example client computing device 300, such as a client device 120 from FIG. 1. In device(s) 300, processing unit(s) 302 can include processing unit(s) 122 and can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

In some examples, memory 304 can represent computer-readable media 124 and can store instructions executable by the processing unit(s) 302, which as discussed above, represents a processing unit incorporated in device 300. Memory 304 can also store instructions executable by external processing units such as by an external CPU, an external GPU, and/or executable by an external accelerator, such as an FPGA type accelerator, a DSP type accelerator, or any other internal or external accelerator. In various examples at least one CPU, GPU, and/or accelerator is incorporated in device 300, while in some examples one or more of a CPU, GPU, and/or accelerator is external to device 300.

In the illustrated example, memory 304 also includes a data store 306. In some examples, data store 306 includes data storage such as a database, a data warehouse, a relational database, or other type of structured or unstructured data storage. In some examples, data store 206 includes a corpus and/or a relational database with one or more sources, tables, indices, stored procedures, and so forth to enable automated annotation of target columns. The sources can include spreadsheets, word documents, text documents, databases, HTML tables, JSON documents, XML documents, reports, and/or other sorts of documents or databases that include data in tabular form. The tables can include target tables, which include target columns, as discussed herein. Data store 306 can store data for the operations of processes, applications, components, and/or modules stored in memory 304 and/or executed by processing unit(s) and/or accelerator(s) 302. Alternately, some or all of the above-referenced data can be stored on separate memories on board one or more processing unit(s) 302 such as a memory 308 on board a CPU-type processor, a GPU-type processor, an FPGA-type accelerator, a DSP-type accelerator, and/or another accelerator.

Device(s) 300 can further include one or more input/output (I/O) interfaces 310 to allow device 300 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). In addition, in device(s) 300, network interface(s) 312, which can include network interface(s) 132, can represent, for example, network interface controllers (NICs) or other types of transceiver devices to send and receive communications over a network.

In the illustrated example, memory 304 also includes an operating system 314, which can include operating system 128. Memory 304 also includes an annotation generation frontend 316, which can include remote annotation generation frontend 130. Annotation generation frontend 316 can include one or more modules and/or APIs, which are illustrated as blocks 318, 320, 322, 324, and 326 although this is just an example, and the number can vary higher or lower.

Functionality described associated with blocks 318, 320, 322, 324, and 326 can be combined to be performed by a fewer number of modules and/or APIs or it can be split and performed by a larger number of modules and/or APIs. For example, block 318 can represent a discovery module with logic to program processing unit 302 of device 300 for performing the discovery operations described herein. For example, discovery module 318 can discover sources by crawling through directories and databases, such as data store 206 and/or an additional external data store, to identify and retrieve sources. Sources include spreadsheets, word documents, text documents, databases, HTML tables, JSON documents, XML documents, reports, and/or other sorts of documents or databases that include data in tabular form.

Block 320 can represent an extraction module with logic to program processing unit 302 of device 300 for performing the extraction operations described herein. For example, extraction module 320 can identify a content area within a source, determine whether the content area includes one or more tables for extraction, determine whether the one or more tables can annotate target columns in a target database, and extract the tables that can annotate target columns.

Block 322 can represent a value indexing module with logic to program processing unit 302 of device 300 for performing the indexing operation described herein. For example, value indexing module 322 can index extracted tables by mapping column values to column names and column names to column values for extracted columns included in extracted tables.

Block 324 can represent a column annotation module with logic to program processing unit 302 of device 300 for performing the automated annotation operations described herein. For example, column annotation module 324 can use the indexes generated by the value indexing module 322 to annotate one or more target columns in a target database. Column annotation module 324 annotates a target column by calculating similarity scores for extracted columns, ranking the extracted columns based on the similarity scores, and annotates the target column using column names of the extracted columns based on the ranking.

Block 326 can represent a frontend module with logic to program processing unit 302 of device 300 to cause the automated annotation of target columns in a target database. For example, frontend module 326 can include an interface for receiving various types of input. The input can include commands that cause device 300 to initiate the automated annotation of target columns and/or cause device 300 to send commands to one or more additional, and in some instances remote, computing devices (e.g., computing device(s) 106) that cause the one or more additional computing devices to start the automated annotation of target columns. The input can also include search queries for data that is included in target columns of target database. For example, the input can include a search query for data that is stored in one or more relational databases of an enterprise.

Bus 328, which can include bus 126, and which in some instances can include one or more of a system bus, a data bus, an address bus, a PCI bus, a Mini-PCI bus, and any variety of local, peripheral, and/or independent buses, can operably connect memory 304 to processing unit(s) 302.

In some examples, one or more of the modules and logic associated with device 200 may operate on device 300 and/or one or more of the modules and logic associated with device 300 may operate on device 200. The modules and logic can be stored on, operated from, or installed from computer-readable media associated with device 200 and/or device 300.

Computer-readable media may include computer storage media and/or communication media. Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Memories 204, 208, 304, and/or 308 are examples of computer storage media. Thus, the memories 204, 208, 308, and/or 304 include tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast, communication media may embody computer readable instructions, data structures, program modules, or other data in a modulated data signal, such as a carrier wave, or other transmission mechanism. As defined herein, computer storage media does not include communication media. That is, memory 204, 208, 304, and/or 308, and the described computer storage media encompassed thereby does not include communications media consisting solely of a modulated data signal, a carrier wave, or a propagated signal, per se.

Figure 4:
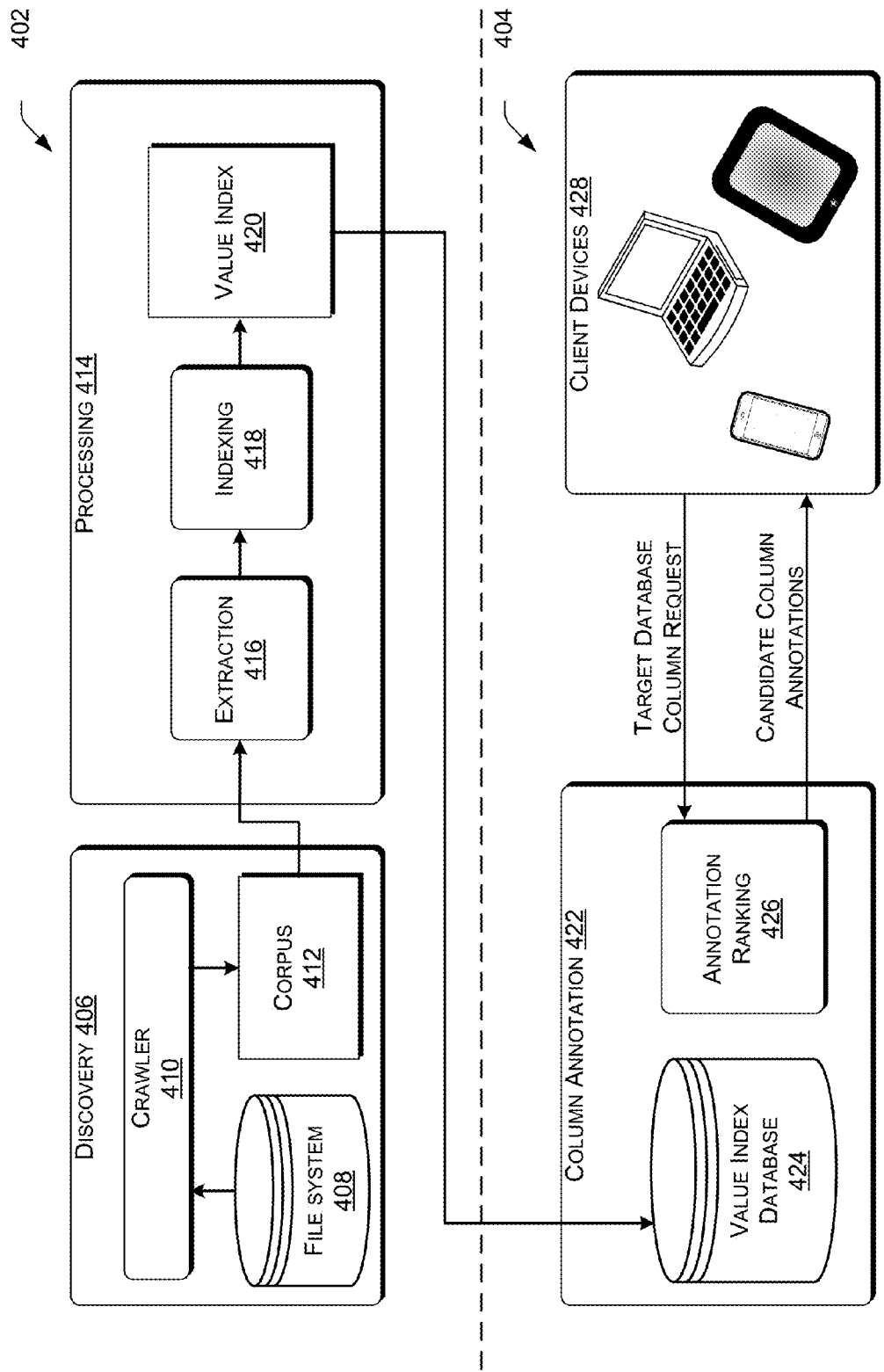
FIG. 4 is a block diagram depicting an example process architecture that can perform automated annotation of target columns of a target database.

FIG. 4 is a block diagram depicting an example architecture of processes that annotation generation tool 216 and/or annotation generation frontend 316 can perform to facilitate automated annotation of target columns of a target database. The architecture includes an offline processing portion 402 and an online processing portion 404. In some examples, annotation generation tool 216 of device(s) 200 can perform offline processing portion 402, and annotation generation tool 216 of device(s) 200 and/or annotation generation frontend 316 of device(s) 300 can perform online processing 404.

In offline processing 402, as illustrated at 406, one or more computing devices can discover and retrieve sources. In some examples, discovery module 218 of computing device(s) 106 searches through file system 408 using crawler 410 in order to discover a corpus 412 of sources. As discussed above, sources can include spreadsheets, word documents, text documents, databases, HTML tables, JSON documents, XML documents, reports, and/or other sorts of documents or databases that include data in tabular form. File system 408 can include directories and/or databases that store sources. For instance, file system 408 can include relational databases that store sources for an enterprise.

When discovering sources, crawler 410 can be set to search for and discover a corpus 412 of sources. In some examples, a corpus 412 of sources may include enough sources to represent the data that an enterprise stores in its relational databases. For instance, discovery module 218 of computing device(s) 106 can continue to discover sources until the corpus 412 includes sources that represent a threshold amount of the data in a relational database. For example, the corpus 412 of tables can represent 75%, 80%, 100%, or another percentage of the data that is stored in the relational databases of an enterprise.

In offline processing 402, as illustrated by 414, the one or more computing devices further process the sources from the corpus 412. In some examples, extraction module 220 of computing device(s) 106 processes the corpus 412 of sources by performing extraction 416 on the sources to extract tables, and value indexing module 222 of computing device(s) 106 then process the extracted tables by indexing 418 each of the extracted tables to generate a value index 420 for the respective extracted table. For instance, in processing 414 tables, computing device(s) 106 can first extract 416 tables from the sources in the corpus 412. As discussed above, extraction 416 can include detecting a content area within the sources and iterating through the rows and columns of the content area to discover the tables for extraction. While iterating through the content area, extraction 416 can identify the tables for extraction in the content area based on identifying header rows within the content area and/or identifying boundaries for tables in the content area.

Processing 414 tables further can include indexing 418 each of the tables that extraction 416 can identify to generate a value index 420 for the extracted tables. To generate the value index 420, computing device(s) 106 can extract columns from the extracted tables and index the extracted columns in the value index 420. Indexing 418 extracted tables can include mapping column values to column names (column identities) and mapping column names to column values for the extracted columns. Column values for an extracted column include the data of the extracted column. For example, column values for an extracted column can include the data within each of the data cells that form the extracted column. The column name for an extracted column includes the name of the extracted column within the extracted table. For example, the column name can include the text and/or data within the first row of the extracted column. For instance, the first row of an extracted column may include the header row. As such, the first row of the column includes the column name of the extracted column.

In online processing 404, as illustrated at 422, column annotation module 224 computing device(s) 106 can annotate target columns of a target database. For instance, computing device(s) 106 can store value indexes 420 for the extracted tables in value index database 424. Value index database 424 can include a local database stored on one or more computing device(s) 106, such as in memory 110, and/or value index database 424 may include a database stored on one or more other computing devices. To annotate target columns, column annotation module 224 of computing device(s) 106 can perform annotation ranking 426 on one or more possible annotations for a target column and use the ranking when selecting annotations for the target column.

For example, and as discussed above, target columns can be annotated using part of and/or all of the column names of extracted columns within value index database 424. As such, column annotation 422 can first rank one or more extracted columns to determine a similarity score between the extracted columns and the target column. To calculate a similarity score, annotation ranking 426 can calculate a value-related score that measures similarities between column values in the extracted column and the column values in the target column. Annotation ranking 426 can calculate a context-related score that measures similarities between table names in the extracted table from which the extracted column is included and table names in a target table from which the target column is included, which are both described in greater detail below with regard to FIG. 9. Annotation ranking 426 can then use the rankings for one or more extracted columns to annotate the target column.

In online processing 404, one or more client devices 428 can send one or more target database column requests to computing device(s) 106. For example, frontend module 326 of device(s) 300 can send a target database column request to computing device(s) through network 104. Target database column requests can include search queries by client devices 428 for data within one or more target databases. For instance, the requests can include search queries for data stored in one or more relational databases of an enterprise. Computing device(s) 106 can then return candidate column annotations to client devices 428 based on the requests, which may include one or more target columns along with annotations that computing device(s) 106 generate for the one or more target columns. As such, client devices 428 can receive target columns that include data that corresponds to the search queries and annotations that describe the target columns.

Figure 5:
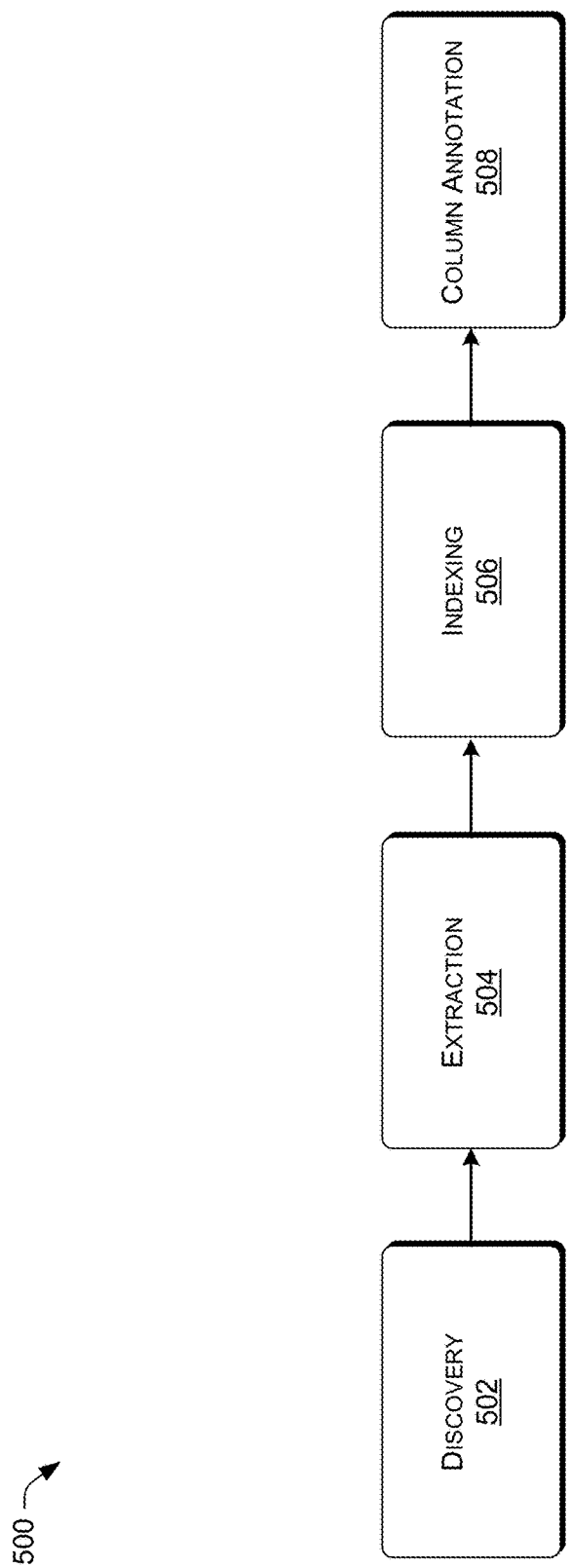
FIG. 5 is a block diagram depicting an example illustrative process for automated annotation of target columns of a target database.

FIG. 5 is a block diagram depicting an example illustrative process 500 that annotation generation tool 216 and/or annotation generation frontend 316 can perform to facilitate automated annotation of target columns of a target database. The illustrated process 500 includes discovery 502, extraction 504, indexing 506, and column annotation 508, which can correspond respectively to discovery 406, extraction 416, indexing 418, and column annotation 422 from FIG. 4. The operations of discovery 502 and extraction 504 are explained in detail below with regard FIG. 6, the operations of indexing 506 are explained in detail below with regard FIG. 7 and FIG. 8, and the operations of column annotation 508 are explained in detail below with regard FIG. 9.

Figure 6:
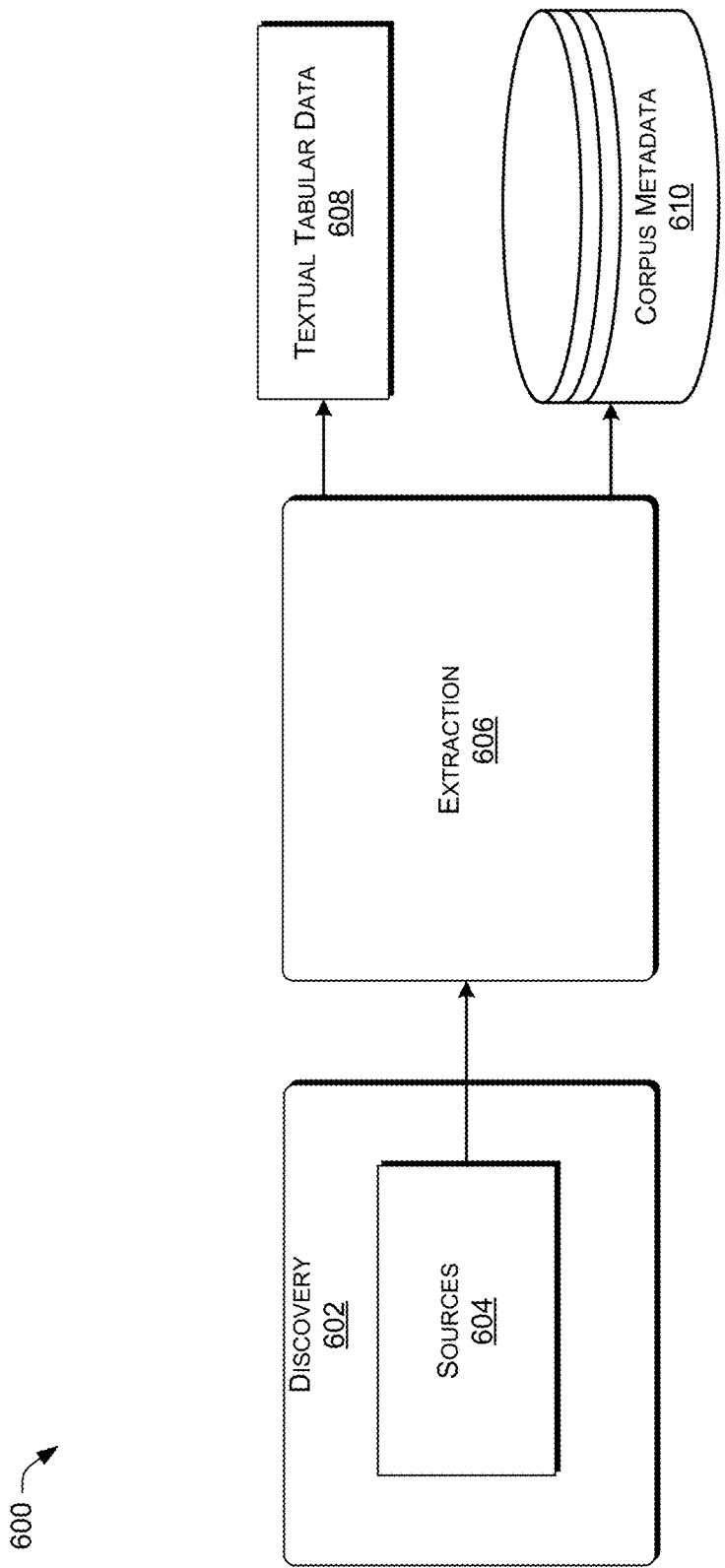
FIG. 6 is a block diagram depicting an example illustrative process for discovering and extracting tables.

FIG. 6 is a block diagram depicting an example illustrative process 600 that annotation generation tool 216 and/or annotation generation frontend 316 can perform to facilitate discovering sources and extracting tables from the sources.

For instance, as illustrated at 602, one or more computing devices can discover sources 604. For example, computing device(s) 106 can crawl directories and/or databases to identify and retrieve sources 604. As discussed above, sources 604 can include spreadsheets, word documents, text documents, databases, HTML tables, JSON documents, XML documents, reports, and/or other sorts of documents or databases that include data in tabular form. As such, in an enterprise environment, discovery 602 may include crawling through the intranet pages of the enterprise to identify and retrieve sources 604, such as spreadsheets and/or reports created for the enterprise using data stored in relations databases. In some examples, discovery 602 can retrieve a source corpus that represents the data that the enterprise stores in the relational databases, such as corpus 412 from FIG. 4.

After discovering sources 604, as illustrated at 606, the one or more computing devices can extract tabular data from the sources 604. In some examples, computing device(s) 106 can extract tabular data from sources 604 using one or more algorithms. The one or more algorithms can identify coordinates that represent an area within sources 604 that include the data, which can correspond to the content area of sources 604. The content area of sources 604 includes all of the textual content in sources 604 and can be identified by the coordinates of its four corners. For example, the content area of a spreadsheet file includes each of the cells within the spreadsheet file that includes data. Using the content area, extraction 606 can identify tables for extraction from within the content area.

To identify tables for extraction, extraction 606 can use one or more rules. For example, one rule that extraction 606 can use is that a content area includes a single table for extraction when the content area does not include any empty cells (i.e., cells without data). In such a situation, extraction 606 can identify the content area as a single table for possible extraction. In another example, extraction 606 can set a maximum percentage of empty cells within a content area, and identify the content area as a single table if it meets that criterion. An additional rule that extraction 606 can use is that if the content area includes at least one empty cell (or a percentage of empty cells that exceeds the specified bound), the content area includes two or more tables for extraction.

When two or more tables are identified as present in a content area, extraction 606 can use one or more algorithms to iterate over the cells in the content area to identify each of the tables. In some examples, iterating over the cells of the content area can include iterating from top to bottom and from left to right through the cells. In other examples, iterating over the cells of the content area may include using an alternative iteration method, such as from left to right and top to bottom. During the iteration process, extraction 606 can identify tables for extraction by detecting empty rows and empty columns included in the content area. For example, extraction 606 can identify that an empty row and an empty column together form a table boundary of a table for extraction. Extraction 606 can use these table boundaries to identify each of the tables for extraction from within the content area.

In various examples, extraction 606 can identify tables for extraction based on content within the content area and/or borders within the content area. For instance, extraction 606 can include identifying a table based on a formatting style (e.g., font type, font color, borders, cell color, etc.) for content that is included in one or more cells of the content area. Extraction 606 can identify that different formatting styles are used for one or more tables within the content area. Additionally, extraction 606 can identify a table for extraction based on the table including a boundary within the content area. For example, the boundary can include a different style of line (e.g., thick line, different color of line, dashed lines, etc.) than other lines within the content area.

After identifying tables for extraction within the content areas of sources 604, extraction 606 can determine whether or not to omit from extraction any of the identified tables based on the data included in the tables. For instance, extraction 606 may omit a table from extraction based on the table including non-text fields in the first row. Tables with non-text fields in the first row may not include a header row (i.e., row that names the extracted table and/or names each column in the extracted table) and as such, are likely to make naming target columns difficult. Alternatively, if the first row of the table includes only text fields, then the first row of the table is more likely to be a header row for the table with each column of the first row including a column name for the corresponding column of the table. As will be discussed below with regard to FIG. 9, column annotation can use column names for extracted columns of the extracted tables to annotate target columns.

Besides omitting from extraction one or more tables that do not include header rows, extraction 606 can omit tables from extraction based on a determination that the tables are not likely to help annotate target columns of a target database. In some examples, extraction 606 can omit tables that only include one column. In some examples, extraction 606 further omits tables that are associated with columns in a table 604 that include a threshold amount of empty cells. The threshold can be set to any of a number of values, such as 20%, 50%, 70%, 80%, or another real value. Extraction then extracts one or more of the remaining tables from sources 604 for further processing.

Extraction 606 stores data and/or information associated with the extracted tables from sources 604 as textual tabular data 608 and corpus metadata 610. Textual tabular data 608 can represent the data included in one or more of the extracted tables from sources 604. In some examples, each of the extracted tables can be stored as a JavaScript Object Notation (JSON) file in textual tabular data 608. Corpus metadata 610 can store metadata information about each of the extracted tables. In some examples, the metadata includes a table name for the extracted table, column names for each of the extracted columns included in an extracted table, the types of data included in the extracted table, and any other sort of information associated with the extracted table that can be stored as metadata.

Figure 7:
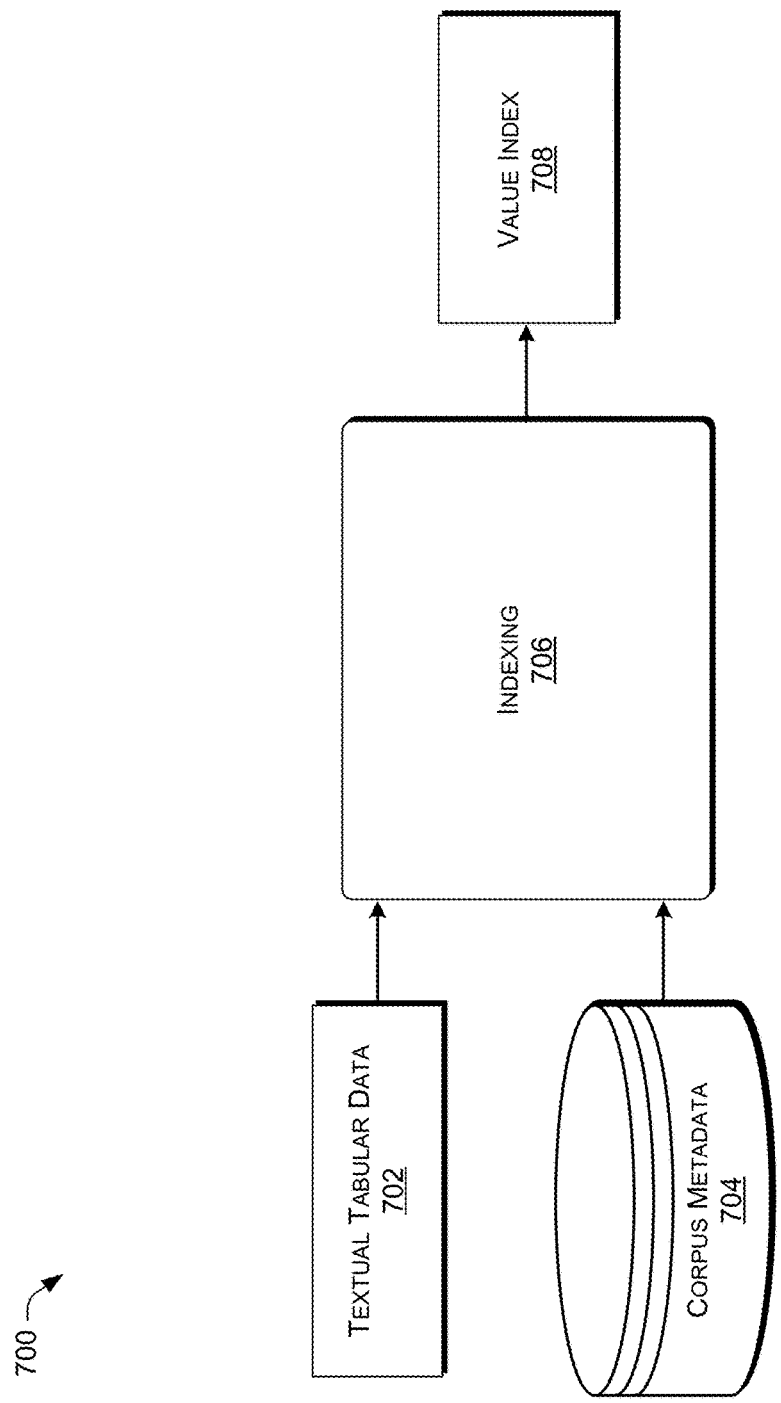
FIG. 7 is a block diagram depicting an example illustrative process for performing value indexing using tables.

FIG. 7 is a block diagram depicting an example illustrative process 700 that annotation generation tool 216 and/or annotation generation frontend 316 can perform to index extracted tables from sources 604 (illustrated in FIG. 6). One or more computing devices index extracted tables using textual tabular data 702 and corpus metadata 704, such as textual tabular data 608 and corpus metadata 610 from FIG. 6, respectively.

For instance, computing device(s) 106 can index 706 extracted tables using textual tabular data 702 and corpus metadata 704 to generate a value index 708 for each extracted table. Computing device(s) 106 can index 706 an extracted table by mapping both column values to column names and column names to column values for extracted columns included in an extracted table. Column values for an extracted column include the data of the extracted column. For example, column values for an extracted column can include the data within each of the data cells that form the extracted column. The column name for an extracted column includes the name (e.g., identity, label, etc.) of the extracted column within the extracted table. For example, the column name can include the text and/or data within the first row of the extracted column. As discussed above, the first row of an extracted column may include the header row. As such, the first row of the column includes the column name of the extracted column.

By mapping both column values to column names and column names to column values for each of the extracted tables, value index 708 can include inverted indexes for the respective extracted table. As will be discussed below, to annotate a target column, computing device(s) 106 can calculate similarity values for one or more extracted columns from extracted tables. Computing device(s) 106 can thus use the inverted indexes for each of the extracted tables to identify extracted columns that are similar to a target column and to calculate similarity scores for each of the extracted columns.

Figure 8:
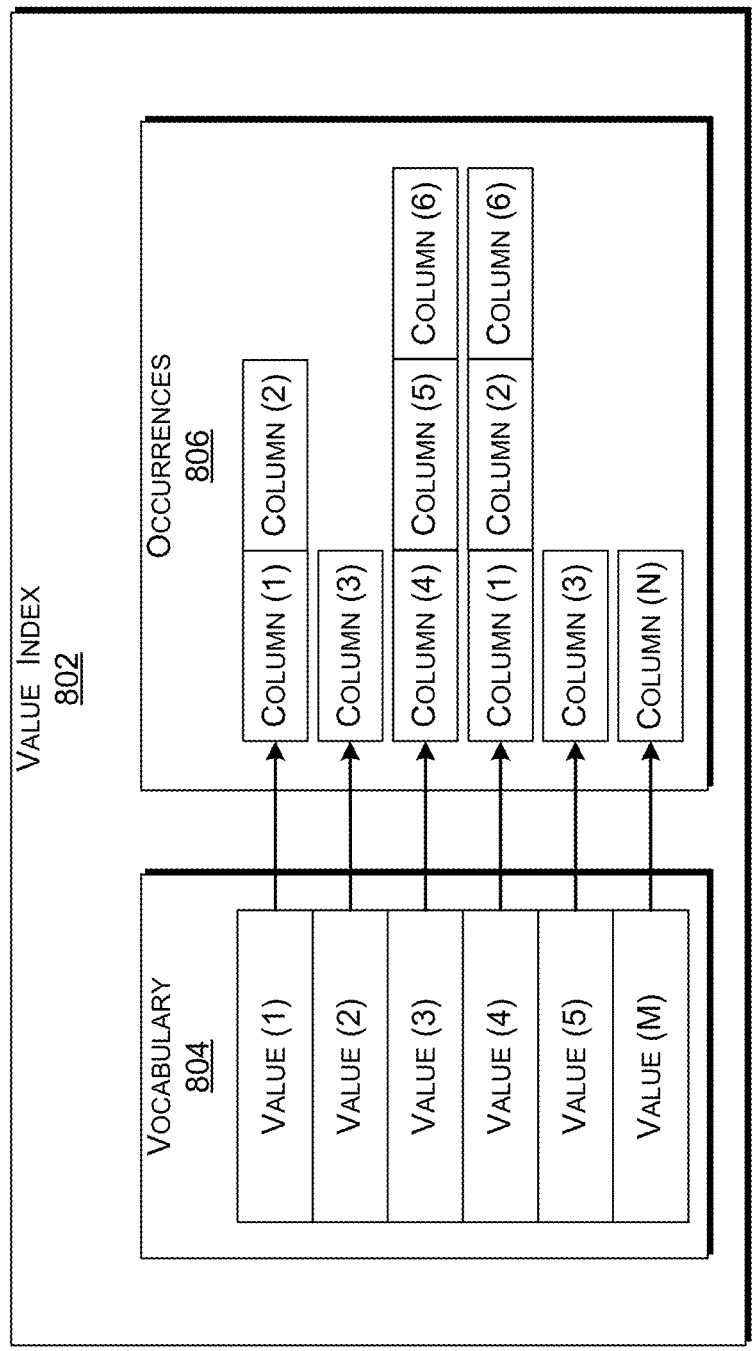
FIG. 8 depicts an example of a value index.

FIG. 8 depicts an example of a value index 802. As illustrated, value index 802 stores the vocabulary 804 of each extracted table and the occurrence 806 of each value in each column of the extracted table. For instance, value index 802 may store the vocabulary 804 for an extracted table, which can include the table name of the extracted table and/or the column name of each of the columns in the extracted table. Value index 802 can store the values for the extracted table, such as values (1)-(M). Values (1)-(M) can include every data value included in the extracted table, such as every data value in each of the cells of the extracted table. Additionally, value index 802 can store the occurrence 806 of each of the values in each of the columns, such as columns (1)-(N). For instance, as illustrated in value index 802, column (1) of the extracted table includes both value (1) and value (4).

When storing the data of the extracted table in value index 802, computing device(s) 106 can normalize the textual value in each of the columns by converting the textual value to lowercase (if the textual value is not already lowercase), and removing any punctuation and accent marks. Computing device(s) 106 normalize the textual value to simplify the value index 802. Simplifying the textual value can make it easier for computing device(s) 106 to use one or more value indexes when rating extracted columns during the annotation process, which is described below.

Figure 9:
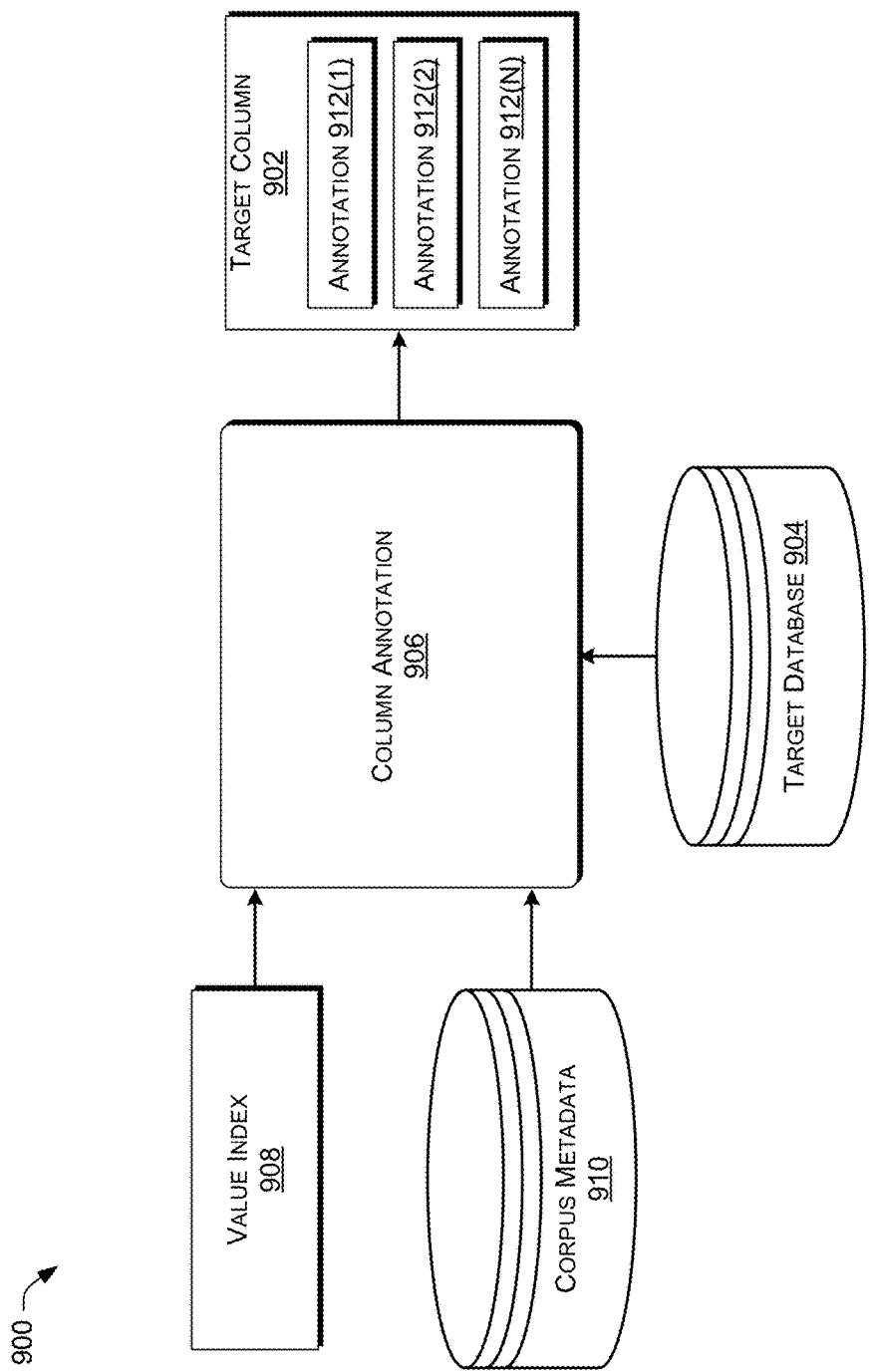
FIG. 9 is a block diagram depicting an example illustrative process for annotating a target column of a target database.

FIG. 9 is a block diagram depicting an example process 900 that annotation generation tool 216 and/or annotation generation frontend 316 can perform to annotate a target column 902 of a target database 904. For instance, column annotation 906 can retrieve target columns from target database 904 and annotate the target columns using value index 908 and corpus metadata 910, such as value index 708 and corpus metadata 610/704, respectively. In some examples, target database 904 can include relational databases for an enterprise that store data corresponding to the enterprise in tabular form. In such examples, column annotation 906 can retrieve and annotate target columns from the relational databases. In other examples, target database 904 can include any database that stores data in tabular form.

In order to annotate a target column 902 from target database 904, column annotation 906 can identify one or more extracted columns from extracted tables using value index 908 and corpus metadata 910. As discussed above, corpus metadata 910 can store metadata information about each of the extracted tables that were identified and extracted from sources. In some examples, the metadata includes a table name for the extracted table, column names for each of the extracted columns included in an extracted table, the types of data included in the extracted table, and/or any other sort of information associated with the extracted table that can be stored as metadata. Value index 908 can map column values to column names and map column names to column values for extracted columns included in extracted tables. As such, column annotation 906 can use value index 908 and corpus metadata 910 to identify candidate-extracted columns that are similar to target column 902. Column annotation 906 can then use the column names of one or more of the candidate-extracted columns to annotate target column 902.

In some examples, column annotation 906 can calculate a similarity score for each of the extracted columns that is similar to target column 902 and rank each of the extracted columns using their respective similarity score. To calculate a similarity score for an extracted column, column annotation 906 can use value-related features and context-related features to find the similarities between the extracted columns and target column 902. As discussed above, value-related features measure similarities between column values in the extracted column and column values in target column 902. Context-related features measure similarities between column names in the extracted table from which the extracted column is included and column names in a target table from which target column 902 is included.

To determine a value-related score ($VR_f$) for an extracted column, column annotation 906 can calculate the Jaccard Containment ($JC(sc,c)$) of an extracted column (sc) in a target column (c) and the inverse, the Jaccard Containment ($JC(c,sc)$) of c ino sc. For example, the Jaccard Containment $JC(sc,c)$ is defined as:

$$JC(sc, c) = \frac{|V(sc) \cap V(c)|}{|V(c)|}$$

Additionally, the Jaccard Containment $JC(c,sc)$ is defined as:

$$JC(c, sc) = \frac{|V(c) \cap V(sc)|}{|V(sc)|}$$

Where $V(c)$ denotes the sets of values in c and $V(sc)$ denotes the sets of values in sc. The value-related score $VR_f$ for sc and c can then include a weighted combination of both $JC(sc,c)$ and $JC(c,sc)$, which is defined as:

$$VR_f(sc,c) = \beta JC(sc,c) + (1-\beta)JC(c,sc)$$

In the above equation, let $\beta$ denote an empirically tuned parameter for the value-related score $VR_f(sc,c)$, where $\beta$ can be any real number. For instance, in some examples, $\beta=0.2$. In such examples, $JC(c,sc)$ is given more weight than $JC(sc,c)$ because of an asymmetric relationship between c and sc. For instance, if the set of values $V(c)$ of c is mostly contained in the set of values $V(sc)$ of sc, then the column name of sc is likely to be a good annotation for c. However, if the set of values $V(sc)$ of sc is mostly contained in the set of values $V(c)$ of c, it is not guaranteed that the column name of sc is a good annotation for c. As such, the value related score $VR_f(sc,c)$ for an extracted column may give more weight to $JC(c,sc)$ than to $JC(sc,c)$.

To determine the context-related score ($CR_f(sc,c)$) for an extracted column, column annotation 906 can use the standard Jaccard similarity for $CR_f(sc,c)$, which is defined as:

$$CR_f(sc,c) = \text{Jaccard}(\text{context}(sc), \text{context}(c))$$

In the above equation, context(sc) denotes a set of unique tokens in the contextual attribute names of sc and context(c) denotes a set of unique tokens in the contextual attribute names of c. Finally, the overall similarity score (Score(c|sc)) between an extracted column and a target column can include a combination of $VR_f(sc,c)$ and $CR_f(sc,c)$, which may be defined as:

$$\text{Score}(c|sc) = \alpha VR_f(sc,c) + (1-\alpha)CR_f(sc,c)$$

Let $\alpha$ denote an empirically tuned parameter for Score (c|sc), where $\alpha$ can be any real number. For instance, in some examples, $\alpha=0.7$. In such examples, $VR_f(sc,c)$ is given more weight than $CR_f(sc,c)$ since the value-related score between an extracted column and a target column may give a better indication of the similarity between the extracted column and the target column than the context-related score.

Column annotation 906 can calculate the similarity score (Score(c|sc)) between one or more extracted columns and target column 902. Column annotation 906 can then rank the one or more extracted columns based on the similarity scores and use the ranking to annotate target column 902. In some examples, a higher similarity score for an extracted column may indicate that the column name for the extracted column is more likely to be a good annotation than a column name of an extracted column that has a lower similarity score. As such, column annotation 906 can annotate target column 902 based on the similarity scores by annotating target column 902 using a column name of the extracted column with the highest similarity score first. Column annotation 906 can then annotate target column 902 with column names of the remaining extracted columns in order of their similarity score.

For instance, and as illustrated in FIG. 9, target column 902 includes annotations 912(1), 912(2), and 912(N). Annotation 912(1) may include a column name of an extracted column that includes the highest similarity score to target column 902. Annotation 912(2) may include a column name of an extracted column that includes the second highest similarity score to target column 902. Finally, annotation 912(N) may include the rest of the column names of any remaining extracted columns that were identified as being similar to target column 902. As such, column annotation 906 can automatically annotate target column 902 without the need of a data steward to manually annotate target column 902. Additionally, column annotation 906 can use the same methods described above to annotate each of the remaining target columns within target database 904.

FIG. 10 depicts an example that annotation generation tool 216 and/or annotation generation frontend 316 can perform to annotate a target column (in this example, the right-side column in target table 1002) in a target database. In the illustrated example, one or more computing devices (such as computing device(s) 106 of FIG. 1) can use extracted table 1004 and/or extracted table 1006 to annotate the target column included in target table 1002. For instance, computing device(s) 106 can first discover and retrieve sources that include extracted tables 1004 and 1006. Computing device(s) 106 can then extract extracted tables 1004 and 1006 from the sources. Next, computing device(s) 106 can index the extracted tables 1004 and 1006.

After indexing extracted tables 1004 and 1006, computing device(s) 106 can annotate the target column of target table 1002 using similarities between the target column and each of the columns in extracted tables 1004 and 1006. To determine the similarities, computing device(s) 106 can calculate a similarity score for each of the columns in extracted tables 1004 and 1006. As discussed above, computing device(s) 106 can calculate a similarity score using value-related features and context-related features for each of the columns in extracted tables 1004 and 1006.

For example, computing device(s) 106 may calculate a high similarity score for the second column (i.e., Working Population per City) of extracted table 1004 based on the second column including a high value-related score and a high context-related score to the target column. As illustrated in FIG. 10, each of the column values in the target column are similar to column values of the second column of extracted table 1004, and most (5 out of 7) of the column values of the second column of extracted table 1004 are similar to the column values of the target column. Moreover, the column names of extracted table 1004 include {U. S. Cities, Working Population Per City, Unemployment Population} while the column names for target table 1002 include {Washington Cities, W.P.}. As such, both extracted table 1004 and target table 1002 include column names that include "Cities." Additionally, extracted table 1004 includes a column name of "Working Population Per City," while target table 1002 includes a column name of "W.P.," which computing device(s) 106 can associate with "Working Population" based on the value-related similarities with extracted table 1004.

In contrast, computing device(s) may calculate a low similarity score for the second column of extracted table 1006 based on the second column including a low value-related score and a low context-related score to the target column. As illustrated in the example of FIG. 10, the target column only includes a single column value that is similar to a column value of the second column of extracted table 1006, and the second column of extracted table 1006 only includes a single column value that is similar to a column value of the target column. Additionally, the column names for extracted table 1006 include {U.S. States, Total Number of College Students} while the column names for target table 1002 include {Washington Cities, W.P.}. Therefore, the context-related score for the second column of extracted table 1006 would be low because the column names for extracted table 1006 are not similar to the column names of target table 1002.

After calculating a similarity score for each of the extracted tables 1004 and 1006, computing device(s) 106 can annotate the target column based on a ranking of the similarity scores. For example, computing device(s) 106 can annotate the target column using the second column of extracted table 1004 since the second column of extracted table 1004 has a high similarity score to the target column. To annotate the target column, computing device(s) 106 can annotate the target column using the column name of the second column of extracted table 1004. For instance, computing device(s) 106 can annotate the target column using "Working Population Per City," which is an accurate annotation for the target column. Computing device(s) 106 can identify that the second column of extracted table 1006 is not a good candidate to annotate the target column since the similarity score for the second column of extracted table 1006 is low. As such, computing device(s) may not annotate the target column with the column name of the second column of extracted table 1006.

Example Clauses

A: A device comprising: a processor; and a computer-readable medium including modules, the modules when executed by the processor, configure the device to generate annotations, the modules comprising: a column discovery module configured to retrieve a table; and a column annotation module configured to annotate a target column of a target table by: determining a similarity between the target column of the target table and a column of the table, the similarity based at least in part on similarities between one or more values in the target column of the target table and one or more column values extracted from the column of the table; and annotating, based at least in part on the similarity, the target column of the target table using a column identity of the column of the table.

B: A device as paragraph A recites, wherein the similarity is further based at least in part on similarities between identities of one or more columns of the target table and column identities of one or more columns of the table.

C: A device as either paragraph A or B recites, wherein the column annotation module is further configured to: determine a first value of a first annotation based at least in part on the similarity; determine a second value of a second annotation based at least in part on another similarity between the target column of the target table and another column of the table, the another similarity based at least in part on similarities between the one or more values in the target column of the target table and one or more column values extracted from the another column of the table; rank the first annotation and the second annotation based at least in part on the first value and the second value; and annotate the target column based at least in part on the ranking of the first annotation and the second annotation.

D: A device as any of paragraphs A-C recites, wherein retrieving the table comprises the discovery module accessing a database of sources to discover a source, the source including the table.

E: A device as any of paragraphs A-D recites, the modules further comprising an extraction module configured to identify the table for extraction from the source based at least in part on an identification of a header row included in the source.

F: A device as any of paragraphs A-E recites, the modules further comprising an extraction module configured to identify the table for extraction from the source based at least in part on at least one of an identification of a border around a group of cells included in the source, or a group of cells included in the source that is surrounded on at least two sides by blank or empty cells.

G: A device as any of paragraphs A-F recites, the modules further comprising an indexing module configured to generate an index for the table, the index comprising column values for the table mapped to individual column identities of columns included in the table.

H: A device as any of paragraphs A-G recites, wherein the index further comprises the individual column identities of the columns included in the table mapped to the column values for the table.

I: A method comprising: retrieving a table; determining a similarity between a target column of a target table and a column of the table, the similarity based at least in part on similarities between one or more values in the target column of the target table and one or more column values extracted from the column of the table; annotating, based at least in part on the similarity, the target column of the target table using a column identity of the column of the table; and storing the annotated target column.

J: A method as paragraph I recites, wherein the similarity is further based at least in part on similarities between identities of one or more columns of the target table and column identities of one or more columns of the table.

K: A method as either paragraphs I or J recites, further comprising: determining a first value of a first annotation based at least in part on the similarity; determine a second value of a second annotation based at least in part on another similarity between the target column of the target table and another column of the table, the another similarity based at least in part on similarities between the one or more values in the target column of the target table and one or more column values extracted from the another column of the table; ranking the first annotation and the second annotation based at least in part on the first value and the second value; and annotating the target column based at least in part on the ranking of the first annotation and the second annotation.

L: A method as any of paragraphs I-K recites, wherein the table is included in a spreadsheet, and the method further comprising discovering the spreadsheet.

M: A method as any of paragraphs I-L recites, further comprising extracting the table from the spreadsheet based at least in part on an identification of a header row within the spreadsheet.

N: A method as any of paragraphs I-M recites, further comprising extracting the table from the spreadsheet based at least in part on at least one of an identification of a border around a group of cells included in the spreadsheet, or a group of cells included in the spreadsheet that is surrounded on at least two sides by blank or empty cells.

O: A method as any of paragraphs I-N recites, further comprising generating an index for the table, the index comprising column values for the table mapped to individual column identities of columns included in the table.

P: A method as any of paragraphs I-O recites, wherein the index further comprises the individual column identities of the columns included in the table mapped to the column values for the table.

Q: A computer-readable medium having computer-executable instructions thereon, the computer-executable instructions to configure a computer to perform a method as any of paragraphs I-P recites.

R: A device comprising: a computer-readable media having computer-executable instructions thereon to configure a computer to perform a method as any of paragraphs I-P recites, the processing unit adapted to execute the instructions to perform the method as any of paragraphs I-P recites.

S: A computer-readable medium having computer-executable instructions to program a computer to perform operations comprising: receiving a table; identifying a column included in the table; identifying a target column in a target table; and annotating the target column included in the target table using an identity of the column included in the table.

T: A computer-readable medium as paragraph S recites, the operations further comprising ranking the identity of the column included in the table, the ranking based at least in part on at least one of: a similarity between at least one value in the target column of the target table and at least one column value of the column included in the table; and a similarity between identities of at least one column of the target table that contains the target column and the identities of at least one column included in the table.

U: A computer-readable medium as either paragraph S or T recites, wherein the table includes a first table and the column includes a first column, the operation further comprising: receiving a second table; identifying a second column included in the second table; and annotating the target column included in the target table using an identity of the second column included in the second table.

V: A computer-readable medium as any of paragraphs S-U recites, the operations further comprising: determining a first similarity score based at least in part on similarities between the first column and the target column; determining a second similarity score based at least in part on similarities between the second column and the target column; and ranking the identity of the first column and the identity of the second column based at least in part on the first similarity score and the second similarity score, and wherein annotating the target column using the identity of the first column and the identity of the second column is based at least in part on the ranking.

W: A system comprising: means for retrieving a table; means for determining a similarity between a target column of a target table and a column of the table, the similarity based at least in part on similarities between one or more values in the target column of the target table and one or more column values extracted from the column of the table; means for annotating, based at least in part on the similarity, the target column of the target table using a column identity of the column of the table; and means for storing the annotated target column.

X: A system as paragraph W recites, wherein the similarity is further based at least in part on similarities between identities of one or more columns of the target table and column identities of one or more columns of the table.

Y: system as either paragraphs W or X recites, further comprising: means for determining a first value of a first annotation based at least in part on the similarity; means for determining a second value of a second annotation based at least in part on another similarity between the target column of the target table and another column of the table, the another similarity based at least in part on similarities between the one or more values in the target column of the target table and one or more column values extracted from the another column of the table; means for ranking the first annotation and the second annotation based at least in part on the first value and the second value; and means for annotating the target column based at least in part on the ranking of the first annotation and the second annotation.

Z: A system as recited in any of paragraphs W-Y recites, wherein the table is included in a spreadsheet, and the system further comprising means for discovering the spreadsheet.

AA: A system as any of paragraphs W-Z recites, further comprising means for extracting the table from the spreadsheet based at least in part on an identification of a header row within the spreadsheet.

AB: A system as any of paragraphs W-AA recites, further comprising means for extracting the table from the spreadsheet based at least in part on at least one of an identification of a border around a group of cells included in the spreadsheet, or a group of cells included in the spreadsheet that is surrounded on at least two sides by blank or empty cells.

AC: A system as any of paragraphs W-AB recites, further comprising means for generating an index for the table, the index comprising column values for the table mapped to individual column identities of columns included in the table.

AD: A system as any of paragraphs W-AC recites, wherein the index further comprises the individual column identities of the columns included in the table mapped to the column values for the table.

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) 106, 120, and/or 200 such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A device comprising:
   a processor; and
   a computer-readable medium including modules, the modules, when executed by the processor, configure the device to generate annotations, the modules comprising:
   a column discovery module configured to retrieve a table; and
   a column annotation module configured to annotate a target column of a target table from a target database by:
     calculating a value-related score between the target column of the target table and a column of the table, the value-related score based at least in part on similarities between one or more values in the target column of the target table and one or more column values extracted from the column of the table, the value-related score being a numerical value-related score;
     calculating a context-related score between the target column of the target table and the column of the table, the context-related score based at least in part on similarities between identities of one or more columns of the target table and column identities of one or more columns of the table, the context-related score being a numerical context-related score;
     calculating a similarity score based on a numerical value comprising a numerical combination of the value-related score and the context-related score, the similarity score being a numerical similarity score; and
     annotating, based at least in part on the similarity score, the target column of the target table using a column identity of the column of the table.

2. The device of claim 1, wherein the value-related score is a weighted combination of a Jaccard Containment of the column in the target column and a Jaccard Containment of the target column in the column.

3. The device of claim 1, wherein the column annotation module is further configured to:
   determine a first value of a first annotation based at least in part on the similarity;
   determine a second value of a second annotation based at least in part on another similarity between the target column of the target table and another column of the table, the another similarity based at least in part on similarities between the one or more values in the target column of the target table and one or more column values extracted from the another column of the table;
   rank the first annotation and the second annotation based at least in part on the first value and the second value; and annotate the target column based at least in part on the ranking of the first annotation and the second annotation.

4. The device of claim 1, wherein retrieving the table comprises the discovery module accessing a database of sources to discover a source, the source including the table.

5. The device of claim 4, wherein the modules further comprise an extraction module configured to identify the table for extraction from the source based at least in part on an identification of a header row included in the source.

6. The device of claim 4, wherein the modules further comprise an extraction module configured to identify the table for extraction from the source based at least in part on at least one of an identification of a border around a group of cells included in the source, or a group of cells included in the source that is surrounded on at least two sides by blank or empty cells.

7. The device of claim 1, wherein the modules further comprise an indexing module configured to generate an index for the table, the index comprising column values for the table mapped to individual column identities of columns included in the table.

8. The device of claim 7, wherein the index further comprises the individual column identities of the columns included in the table mapped to the column values for the table.

9. A processor implemented method comprising:
retrieving a table, under control of one or more processors;
calculating, using the one or more processors, a value-related score between a target column of a target table from a target database and a column of the table, the value-related score based at least in part on similarities between one or more values in the target column of the target table and one or more column values extracted from the column of the table, the value-related score being a numerical value-related score;
calculating, using the one or more processors, a context-related score between the target column of the target table and the column of the table, the context-related score based at least in part on similarities between identities of one or more columns of the target table and column identities of one or more columns of the table, the context-related score being a numerical context-related score;
calculating, using the one or more processors, a similarity score based on a numerical value comprising a numerical combination of the value-related score and the context-related score, the similarity score being a numerical similarity score;
annotating, using the one or more processors and based at least in part on the similarity score, the target column of the target table using a column identity of the column of the table; and
storing, using the one or more processors, the annotated target column.

10. The processor implemented method of claim 9, wherein the value-related score is a weighted combination of a Jaccard Containment of the column in the target column and a Jaccard Containment of the target column in the column.

11. The processor implemented method of claim 9, further comprising:
determining a first value of a first annotation based at least in part on the similarity;
determining a second value of a second annotation based at least in part on another similarity between the target column of the target table and another column of the table, the another similarity based at least in part on similarities between the one or more values in the target column of the target table and one or more column values extracted from the another column of the table;
ranking the first annotation and the second annotation based at least in part on the first value and the second value; and
annotating the target column based at least in part on the ranking of the first annotation and the second annotation.

12. The processor implemented method of claim 9, wherein the table is included in a spreadsheet, and the method further comprising discovering the spreadsheet.

13. The processor implemented method of claim 12, further comprising extracting the table from the spreadsheet based at least in part on an identification of a header row within the spreadsheet.

14. The processor implemented method of claim 12, further comprising extracting the table from the spreadsheet based at least in part on at least one of an identification of a border around a group of cells included in the spreadsheet, or a group of cells included in the spreadsheet that is surrounded on at least two sides by blank or empty cells.

15. The processor implemented method of claim 9, further comprising generating an index for the table, the index comprising column values for the table mapped to individual column identities of columns included in the table.

16. The processor implemented method of claim 15, wherein the index further comprises the individual column identities of the columns included in the table mapped to the column values for the table.

17. A non-transitory computer storage medium having computer-executable instructions to program a computer to perform operations comprising:
performing receiving a table;
identifying a column included in the table;
identifying a target column in a target table from a target database;
calculating a value-related score between the target column of the target table and the column of the table, the value-related score based at least in part on similarities between one or more values in the target column of the target table and one or more column values extracted from the column of the table, the value-related score being a numerical value-related score;
calculating a context-related score between the target column of the target table and the column of the table, the context-related score based at least in part on similarities between identities of one or more columns of the target table and column identities of one or more columns of the table, the context-related score being a numerical context-related score;
calculating a similarity score based on a numerical value comprising a numerical combination of the value-related score and the context-related score, the similarity score being a numerical similarity score; and
annotating, based at least in part on the similarity score, the target column included in the target table using an identity of the column included in the table.

18. The non-transitory computer storage medium of claim 17, the operations further comprising ranking the identity of the column included in the table, the ranking based at least in part on at least one of:
a similarity between one or more values in the target column of the target table and one or more column values of the column included in the table; and a similarity between identities of one or more columns of the target table that contains the target column and the identities of one or more columns included in the table.

19. The non-transitory computer storage medium of claim 17, wherein the table includes a first table and the column includes a first column, the operation further comprising:
receiving a second table;
identifying a second column included in the second table; and
annotating the target column included in the target table using an identity of the second column included in the second table.

20. The non-transitory computer storage medium of claim 19, the operations further comprising:
determining a first similarity score based at least in part on similarities between the first column and the target column;
determining a second similarity score based at least in part on similarities between the second column and the target column; and
ranking the identity of the first column and the identity of the second column based at least in part on the first similarity score and the second similarity score,
and wherein annotating the target column using the identity of the first column and the identity of the second column is based at least in part on the ranking.

* * * * *